United States Patent
Kernahan

(10) Patent No.: US 8,154,892 B2
(45) Date of Patent: Apr. 10, 2012

(54) METHOD FOR CONTROLLING ELECTRICAL POWER

(75) Inventor: Kent Kernahan, Cupertino, CA (US)

(73) Assignee: Arraypower, Inc., Sunnyvale, CA (US)

( * ) Notice: Subject to any disclaimer, the term of this patent is extended or adjusted under 35 U.S.C. 154(b) by 327 days.

(21) Appl. No.: 12/473,356

(22) Filed: May 28, 2009

(65) Prior Publication Data

US 2010/0301817 A1  Dec. 2, 2010

Related U.S. Application Data

(63) Continuation-in-part of application No. 12/276,411, filed on Nov. 23, 2008, now Pat. No. 7,929,324, which is a continuation-in-part of application No. 12/061,025, filed on Apr. 2, 2008, now Pat. No. 7,719,864.

(51) Int. Cl.
    *H02J 1/10* (2006.01)
(52) U.S. Cl. ............... 363/65; 363/71; 700/298
(58) Field of Classification Search .......... 700/298; 323/234; 324/761.01; 60/641.8; 363/65, 363/71
    See application file for complete search history.

(56) References Cited

U.S. PATENT DOCUMENTS

| | | | | |
|---|---|---|---|---|
| 4,649,334 A * | 3/1987 | Nakajima | ............ | 323/299 |
| 4,868,379 A * | 9/1989 | West | ............ | 250/203.4 |
| 5,001,406 A * | 3/1991 | Peterson | ............ | 318/400.01 |
| 5,017,860 A * | 5/1991 | Germer et al. | ............ | 324/142 |
| 5,276,706 A * | 1/1994 | Critchlow | ............ | 375/343 |
| 5,621,300 A * | 4/1997 | Sato et al. | ............ | 320/101 |
| 5,654,883 A * | 8/1997 | Takehara et al. | ............ | 363/79 |
| 5,670,833 A * | 9/1997 | Mengelt et al. | ............ | 307/66 |
| 5,682,305 A * | 10/1997 | Kurokami et al. | ............ | 363/79 |
| 5,739,724 A * | 4/1998 | Alexandre et al. | ............ | 331/1 R |
| 5,869,956 A * | 2/1999 | Nagao et al. | ............ | 323/299 |
| 6,172,481 B1 * | 1/2001 | Curtiss | ............ | 320/127 |
| 6,493,246 B2 | 12/2002 | Suzui | | |
| 6,639,413 B2 | 10/2003 | Whitehead | | |
| 7,550,952 B2 * | 6/2009 | Kurokami et al. | ............ | 322/45 |
| 7,573,209 B2 * | 8/2009 | Ashdown et al. | ............ | 315/307 |
| 7,719,864 B2 | 5/2010 | Kernahan et al. | | |
| 7,843,085 B2 * | 11/2010 | Ledenev et al. | ............ | 307/80 |
| 7,884,500 B2 | 2/2011 | Kernahan | | |
| 2002/0030365 A1 * | 3/2002 | Underwood et al. | ....... | 290/40 B |
| 2002/0057751 A1 * | 5/2002 | Jagger et al. | ............ | 375/346 |
| 2002/0080631 A1 | 6/2002 | Kanouda et al. | | |
| 2004/0097914 A1 * | 5/2004 | Pantera et al. | ............ | 606/34 |
| 2004/0169488 A1 * | 9/2004 | Maeda et al. | ............ | 318/801 |
| 2004/0225225 A1 | 11/2004 | Naumov et al. | | |
| 2005/0139259 A1 | 6/2005 | Steigerwald et al. | | |
| 2006/0239389 A1 | 10/2006 | Coumou | | |
| 2007/0040825 A1 | 2/2007 | Mamba | | |
| 2007/0139137 A1 | 6/2007 | Muniraju et al. | | |

(Continued)

OTHER PUBLICATIONS

International Preliminary Report on Patentability issued in PCT/US2010/035893, mailed Nov. 29, 2011.

*Primary Examiner* — Ramesh Patel

(74) *Attorney, Agent, or Firm* — The Marbury Law Group PLLC

(57) ABSTRACT

Power output of a power generation system is controlled by measuring the output voltage of the system, dividing the measured voltage value into a target power value, then controlling the current provided by the generation system to the calculated value. In some embodiments the power generation system is connected to a grid.

4 Claims, 17 Drawing Sheets

505

U.S. PATENT DOCUMENTS

| | | |
|---|---|---|
| 2008/0078436 A1 | 4/2008 | Nachamkin et al. |
| 2009/0102437 A1* | 4/2009 | Nakagawa .................. 323/217 |
| 2009/0160258 A1 | 6/2009 | Allen et al. |
| 2009/0160259 A1 | 6/2009 | Naiknaware et al. |
| 2010/0157632 A1 | 6/2010 | Batten et al. |
| 2010/0157638 A1 | 6/2010 | Naiknaware et al. |
| 2010/0164288 A1 | 7/2010 | Kernahan et al. |
| 2011/0055303 A1 | 3/2011 | Slavin |
| 2011/0055445 A1 | 3/2011 | Gee et al. |
| 2011/0160930 A1 | 6/2011 | Batten et al. |
| 2011/0216512 A1 | 9/2011 | Vosper et al. |

* cited by examiner

METHOD FOR CONTROLLING ELECTRICAL POWER

CROSS-REFERENCE TO RELATED APPLICATIONS

This application is a continuation-in-part of and claims priority to commonly-owned U.S. Nonprovisional application Ser. No. 12/276,411, filed Nov. 23, 2008, now U.S. Pat. No. 7,929,324, entitled "Blade Architecture Array Converter," which itself is a continuation-in-part of commonly-owned U.S. Nonprovisional application Ser. No. 12/061,025 filed on Apr. 2, 2008, now U.S. Pat. No. 7,719,864, entitled "Distributed Multiphase Converters." U.S. Nonprovisional application Ser. No. 12/061,025 is incorporated herein by reference in its entirety.

BACKGROUND

In the prior art of power generation, overwhelmingly dominated by rotating power generators for decades, noise on a power line is dealt with by electrical filtering. Filtering is done at various stages, including the filtering effect of a large power transformer in a residential area. With the advent of alternative power generation, for example solar power, wherein the provided alternative power does not rise from an element rotating at a predetermined speed, other noise sources are introduced. Loads, for example an appliance motor turning on or off, often introduce line noise of both a positive and negative polarity.

A typical means for controlling alternative power such as solar panels is a central inverter, or sometimes a "microinverter" connected to each solar panel, the various microinverter outputs then connected in parallel. The electronics employed in inverters electrically provide a filtering effect with a corner frequency on the order of a few hundred hertz to perhaps 1 Khz. Noise of a higher frequency is not attenuated. FIGS. 1A, 1B, and 1C illustrate the current state of the art which provides a number of solar panels configured in a series arrangement, the power from the panels then converted from direct current to alternating current. FIG. 1A illustrates a central configuration. FIG. 1B illustrates a string configuration. FIG. 1C illustrates a multi-string configuration.

SUMMARY

An apparatus for controlling power generation, for example (but not limited to) the apparatus disclosed in aforementioned U.S. patent application '025, includes means for measuring voltage, for calculating parameters, and for the execution of a control algorithm, and control elements to provide control of the power delivered to a load. By repetitively dividing the instantaneous voltage at the output terminals of such a system into a desired (idealized) power value and providing the result as a value of current, power is controlled to the desired value and any noise on the voltage signal is diminished or eliminated. In an example system wherein a solar system is connected to an electrical power grid, the method according to the present invention comprises the steps of first measuring the grid voltage, dividing a time-varying desired instantaneous power value by the grid voltage, then providing an electrical current of a value that will provide a power output of the desired value. The desired power value may be changed from time to time.

DETAILED DESCRIPTION OF THE INVENTION

| Definition of some terms: | |
| --- | --- |
| Grid | AC power provided to a premises by an outside source, typically a utility company. |
| PV | Photovoltaic panel, another term for the commonly-used "solar panel" |
| cps | Abbreviation for "cycles per second"; the frequency of an AC power supply |
| AC | Abbreviation for "alternating current", though one may also view it as "alternating voltage" in that the polarity of the voltage provided alternates. |
| DC | Abbreviation for "direct current"; electrical power that is always provided in a given polarity. The voltage of the power source may or may not be fixed. |
| FET | Field effect transistor |
| PAM | Pulse Amplitude Modulation. A form of signal modulation where the message information is encoded in the amplitude of a series of signal pulses. |

-continued

Definition of some terms:

PCM  Pulse Code Modulation. A digital representation of an analog signal where the magnitude of the signal is sampled regularly at uniform intervals, then quantized to a series of symbols in a digital (usually binary) code.

Figure 2:
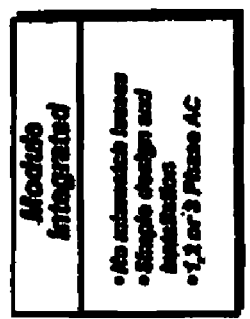
FIG. 2 shows a brief example of the present invention.
Figure 2:
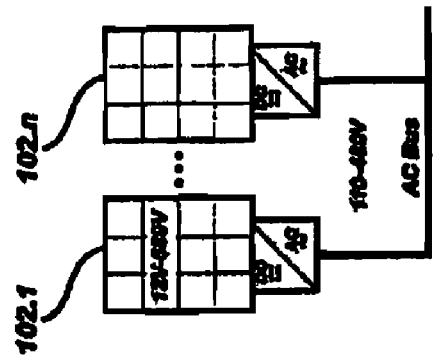
Figure 1C:
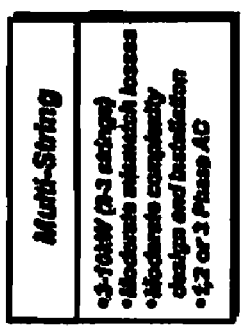
FIG. 1A-1C show examples of prior art panel configurations.
Figure 1C:
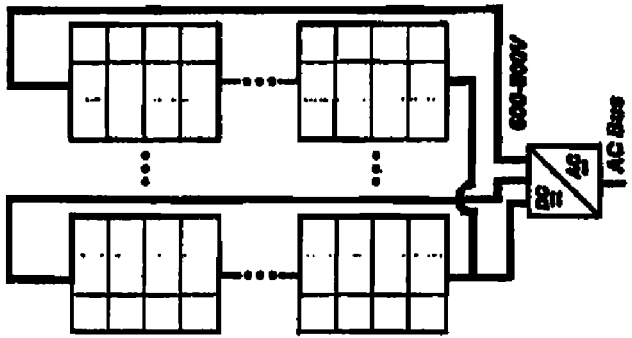
Figure 1B:
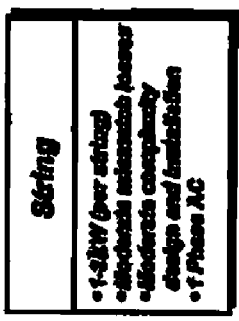
Figure 1B:
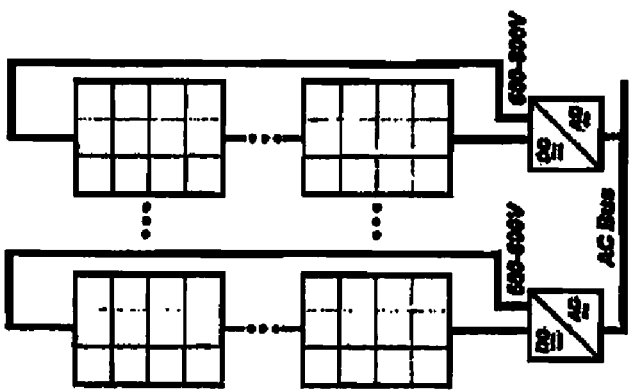
Figure 1A:
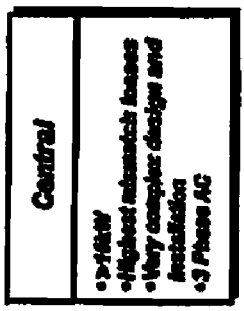
Figure 1A:
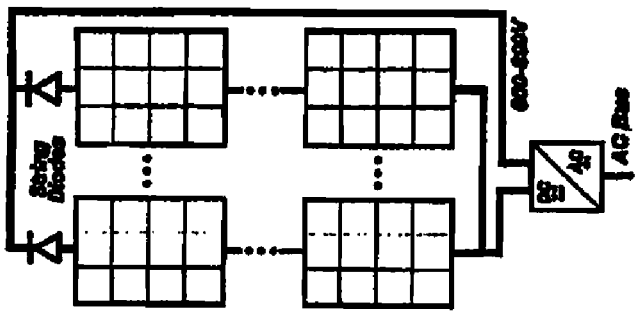
Figure 3:
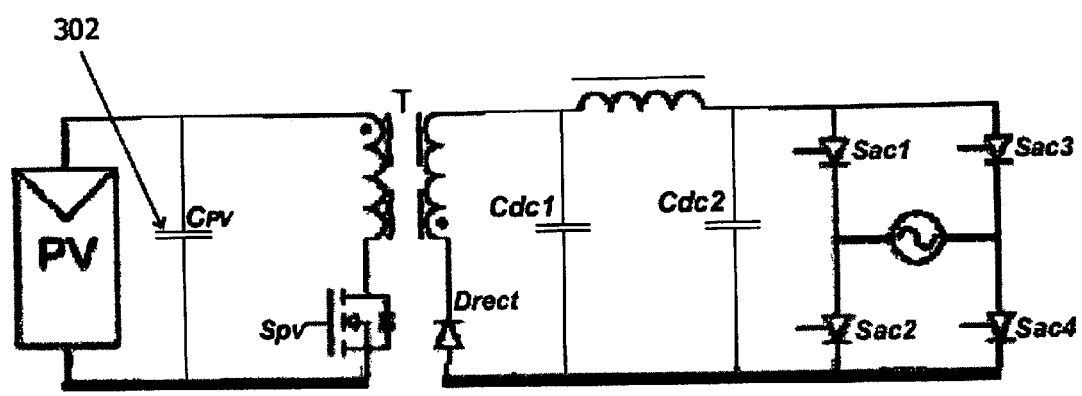
FIG. 3 is an example of the current art. PRIOR ART.

According to the present invention, a DC to pulse amplitude modulated ("PAM") current converter, denominated a "PAMCC" is connected to an individual solar panel ("PV"). FIG. 2 illustrates an embodiment of the present invention in which DC to AC converters are connected to solar panels 102.1 and 102.n. A solar panel typically is comprised of a plurality, commonly seventy-two, individual solar cells connected in series, wherein each cell provides approximately 0.5 volt at some current, the current being a function of the intensity of light flux impinging upon the panel. The PAMCC receives direct current ("DC") from a PV and provides pulse amplitude modulated current at its output. The pulse amplitude modulated current pulses are typically discontinuous or close to discontinuous with each pulse going from near zero current to the modulated current and returning to near zero between each pulse. The pulses are produced at a high frequency relative to the signal modulated on a sequence of pulses. The signal modulated onto a sequence of pulses may represent portions of a lower frequency sine wave or other lower frequency waveform, including DC. When the PAMCC's output is connected in parallel with the outputs of similar PAMCCs an array of PAMCCs is formed, wherein the output pulses of the PAMCCs are out of phase with respect to each other. An array of PAMCCs constructed in accordance with the present invention form a distributed multiphase inverter whose combined output is the demodulated sum of the current pulse amplitude modulated by each PAMCC. If the signal modulated onto the series of discontinuous or near discontinuous pulses produced by each PAMCC was an AC current sine wave, then a demodulated, continuous AC current waveform is produced by the array of PAMCCs. This AC current waveform is suitable for use by both the "load", meaning the premises that is powered or partially power by the system, and suitable for connection to a grid. For example, in some embodiments an array of a plurality of PV-plus-PAMCC modules are connected together to nominally provide split-phase, Edison system 60 cps 240 volt AC to a home.

Before discussing an array comprising a plurality of PV-plus-PAMCC modules, we first look at an individual PAMCC. For example, referring to FIG. 4, a PV panel is electronically represented by the diodes and capacitor shown as reference numeral 401. Collectively the components comprising an PAMCC (or sometimes "micro inverter") are referred to as simply "the PAMCC 400." Current is provided by the PV 401 to a positive input terminal 402 and a negative input terminal 403. The positive input terminal 402 is connected in series with a coil L 1 406. The negative input terminal 403 is connected in series with a coil L 2 405. In one embodiment coils L 1 406 and L 2 405 form a one-to-one transformer with two input and two output terminals. Such an embodiment provides better current matching through the two current paths. Hereinafter we refer to the single transformer as "T 1" 407. A switch Q 1 404, for example an NMOS FET, is connected across the load side of the transformer 407, with the source of Q 1 404 connected in parallel to the negative terminal of the T 1 407 output. Note that the negative sides of the PV 401 and of the PAMCC 400 are floating; that is, they are not grounded. A controller 412 has an output terminal 414 which provides a signal to the control gate (Q 1 G) of Q 1 404 on a line 411. In some embodiments the controller 412 is a microprocessor with additional logic and is operated by a program. The controller 412 is discussed in more detail hereinafter.

The controller 412 comprises a plurality of output terminals, each operated independently. Four controller 412 output terminals 415 through 418 are connected to the control terminals of four SCRs (CR 11 424; CR 22 423; CR 12 425; and CR 21 426 respectively) by four lines 119 through 422 respectively (inner-connections not shown). Each line, therefore each SCR, is independently controlled by control signals from the controller 412. The anode terminals of CR 11 424 and CR 22 423 are connected in parallel to the positive output terminal of T 1 407. The cathode terminals of SCRs CR 12 425 and CR 21 426 are connected in parallel to the negative output terminal of T 1 407. The cathode terminal of SCR CR 11 424 and the anode terminal of SCR CR 12 425 are connected in parallel to a coil L 12 430. The cathode terminal of SCR CR 22 423 and the anode terminal of SCR CR 21 426 are connected in parallel to a coil L 22 431. A terminal 434 from coil L 12 430 is arbitrarily designated as providing a "phase 1" (P 1) output and a terminal 436 from coil L 22 431 is arbitrarily designated as providing a "phase 2" (P 2) output. In some embodiments the coils L 12 430 and L 22 431 are embodied in a one-to-one transformer. In the embodiment exemplified in FIG. 4 coils L 12 430 and L 22 136 are separate coils. A capacitor C 12 438 is across the input side of coil L 12 430 and a neutral output terminal 432. Another capacitor C 22 is across the input side of coil L 22 431 and the neutral output terminal 432. In another embodiment there is no neutral output terminal 432 and there is a single capacitor across the input terminals of coil L 12 430 and L 22431; in this embodiment the voltage rating of the capacitor is at least twice that of capacitors C 22 440 and C 12 438.

The method of the invention is implemented by control signals on lines 411 and 419 through 422. In particular the control signal Q 1 G on line 411 and signals CR 11 T on line 419; CR 22 T on line 420; CR 12 T on line 421; and CR 21 T on line 422 connect and disconnect the current provided by PV 401 in a sequence within the PAMCC 400 with a high-frequency period, for example 30 KHz, which provides a PCM signal which is modulated by a slower, 60 cycle pattern, thereby providing an output whose amplitude is a PAM signal approximating a sine wave.

Figure 4:
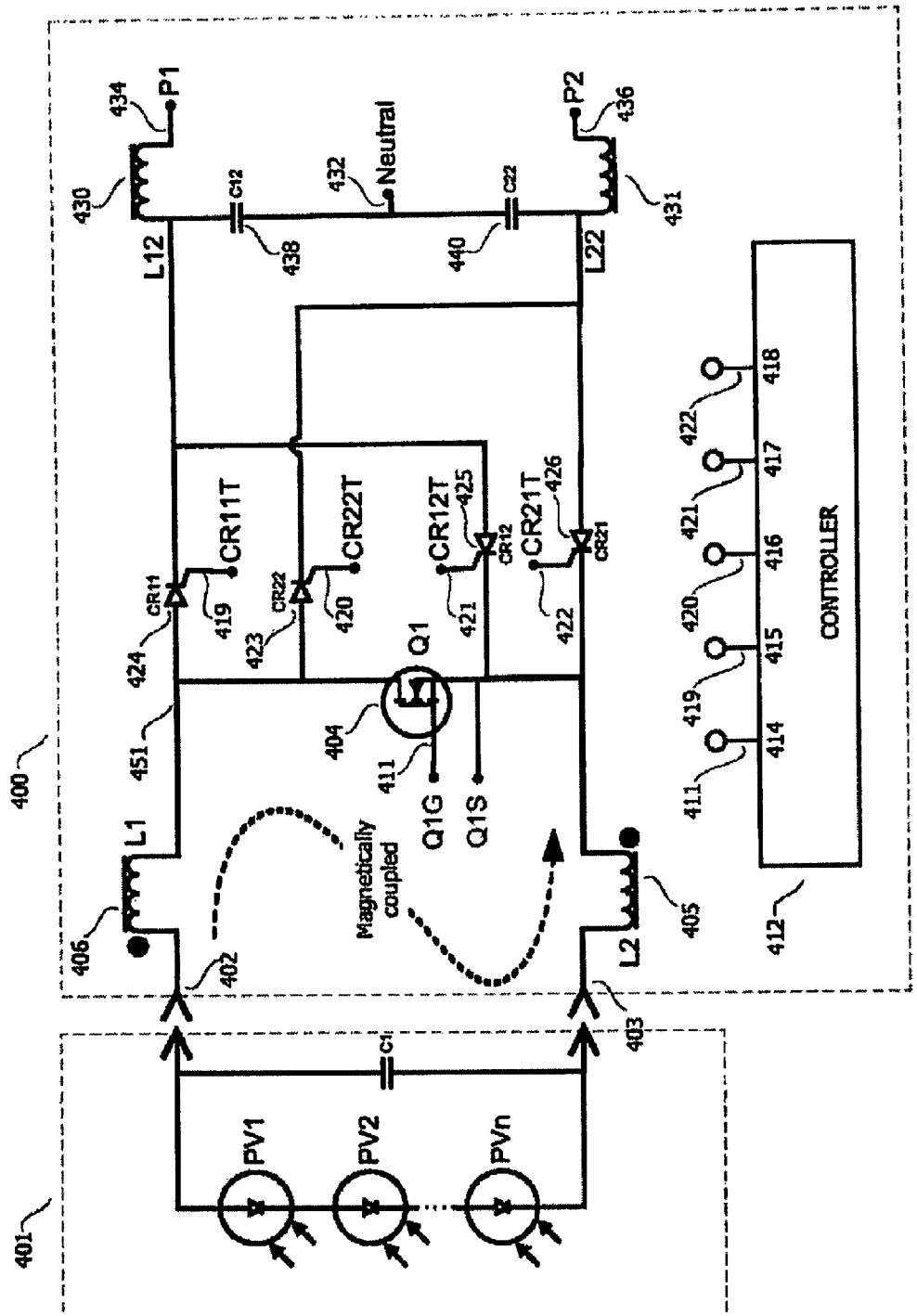
FIG. 4 is an example of a single pulse amplitude modulated current converter according to the present invention.

Referring to FIG. 4, the initial conditions are as follows: Q 1 404, CR 11 424, CR 22 423, CR 12 425 and CR 21 426 de-energized; coils L 1 406, L 2 405, L 12 430 and L 22 431 empty of current; and photovoltaic cells PV 1 through PVn dark. In this condition the grid AC voltage is applied between P 1 434 and P 2 436 and experiences a path through L 12 430, C 12 438, C 22 440 and L 22 431. The resonant frequency selected for a reconstruction filter comprising L 12 430 and C 12 438 is typically chosen to be about one half the switching frequency of Q 1 404. The resonant frequency of a reconstruction filter comprising L 22 431 and C 22 440 is chosen to be the same as the reconstruction filter of L 12 430 and C 12 438. In one embodiment the transistor Q 1 404 is selected for a specified switching frequency of approximately 30 kHz and the resonant frequency of the reconstruction filters are then designed for 15 kHz. With the grid AC voltage typically being 60 Hz, an unimportant amount of capacitive reactive load is presented to the grid.

Circuit operation begins with the solar panel 401 being exposed to sufficient light to produce significant current. The presence of the current may be observed as an increase in voltage across Q 1 404. At this point Q 1 404 is initially turned on by applying a signal from controller 412 on line 411 between Q 1 G and Q 1 S. The interface between the controller 412 and the transistor Q 1 404 may be optically isolated, transformer coupled, or the controller 412 may be connected to Q 1 S. In this state L 1 406 and L 2 405 begin to charge with current. When the voltage across PV 401 falls to a predetermined value, the time to charge the coils is noted in order to calculate the current and standard operation begins with the next grid zero crossing. In one embodiment this is when the voltage at P 1 crosses above P 2 while P 1 is going positive and P 2 is going negative. At this point signals CR 11 T 419 and CR 21 T 421 are asserted such that CR 11 424 and CR 21 426 will conduct when current are applied to them.

Case 1: PWM Modulation for Positive Half Wave of the Grid

Figure 5:
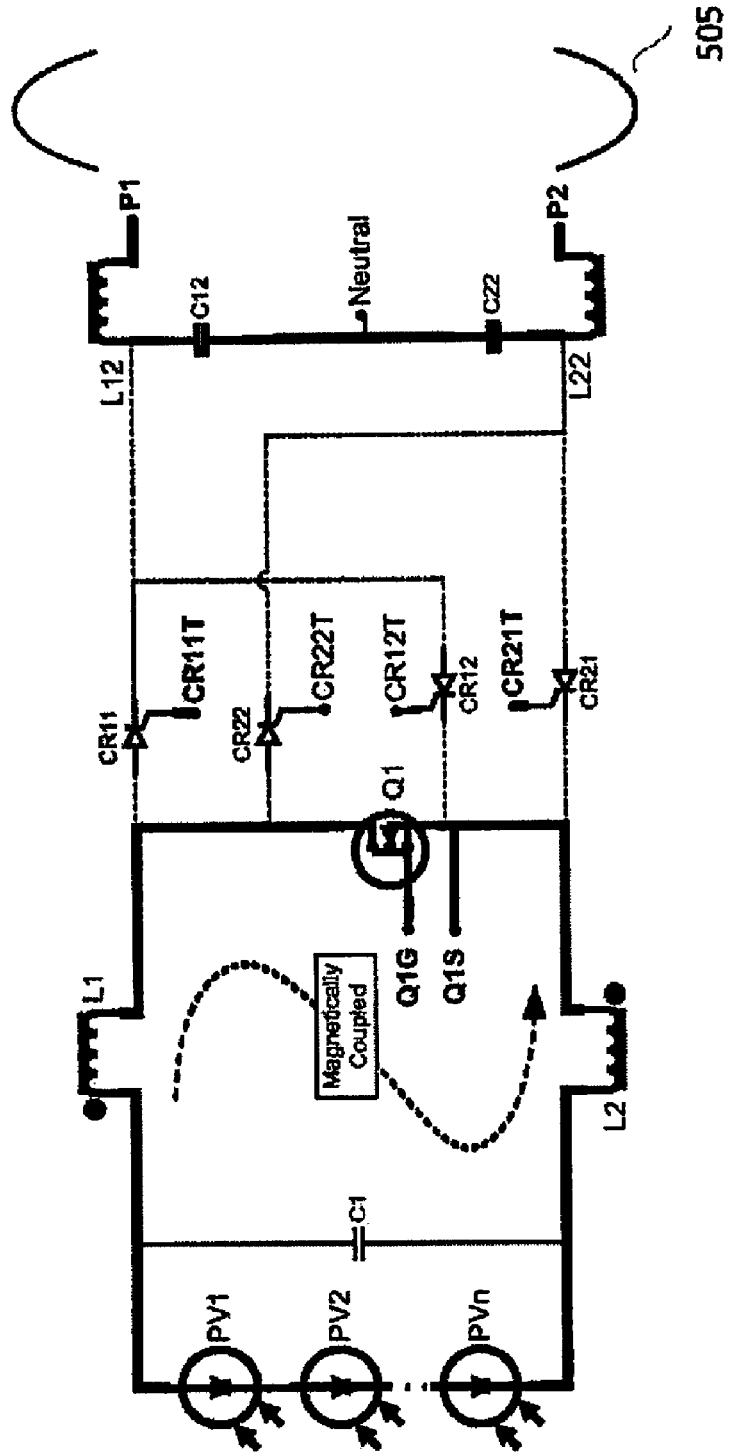
FIG. 5 shows a pulse amplitude modulated current converter with a transistor completing the circuit to charge inductors while reconstruction filters produce current pulses for the grid positive half phase.

FIG. 5 through FIG. 8 will be referred to in describing the operation of PAMCC 400. Note that the components correspond to those of FIG. 4, but the reference numbers have been left off so as not to obscure the description. However we refer to the reference numbers provided by FIG. 4. Looking to FIG. 5, with L 1 406 and L 2 405 charged, Q 1 404 is turned off for a pulse width modulated time. After the off time has expired, Q 1 404 is turned on until the end of the current switching cycle. During the time that Q 1 404 is off, current previously stored in L 1 406 and L 2 405, together with the current flowing in PV 401, is applied to the input terminals of CR 11 424 and CR 21 426, which remain enabled as a result of the signals CR 11 T 419 and CR 21 T 421 for the entire positive half cycle of the grid. The positive half cycle of the grid is defined as the condition wherein the voltage at output terminal P 1 434 is greater than the voltage at output terminal P 2 436. The charge in the current pulse delivered through the SCR CR 11 424 is initially stored on capacitor C 12 438, creating a voltage more positive on the near end of coil L 12 430 relative to the end of coil L 12 which is connected to the output terminal P 1 434. The charge in the current pulse delivered through SCR CR 21 426 is initially stored on capacitor C 22 440, a voltage more negative on the near end of coil L 22 431 relative to the end of coil L 22 which is connected to the output terminal P 2 436. This is the initial condition for both the reconstruction filter comprising L 12 430, C 12 438 and the reconstruction filter comprising L 22 431, C 22 440. At this point the reconstruction filters will transform the pulse width modulated current pulse delivered to them to a pulse amplitude modulated (PAM) half sine wave of current 505 delivered to the grid as shown in FIG. 5.

The resonant frequency for the reconstruction filters are chosen to be about one half the switching frequency of Q 1 404 so that one half of a sine wave of current will be provided to P 1 434 and P 2 436 for each pulse width modulated current pulse delivered to them. Since the resonant frequency of each reconstruction filter is independent of the pulse width of current applied to it, and the charge in the instant current pulse applied to the reconstruction filter must be equal to the charge in the half sine wave of current delivered out of the reconstruction filter to the grid, changes in the pulse width of input current will be reflected as changes in the amplitude of the output of the reconstruction filters. As the current in the inductors in the reconstruction filters returns to zero, the next pulse of current is delivered to the capacitors of the reconstruction filters because the frequency of the reconstruction filters is one half the rate at which pulse width modulated current pulses are produced by Q 1 404.

The off time of Q 1 404 is modulated such that the width of current pulses produced is in the shape of the grid sine wave. The reconstruction filters transform this sequence of pulse width modulated current pulses into a sequence of pulse amplitude modulated current pulses whose amplitude follows corresponding points of the shape of the grid sine wave.

So long as the grid half cycle remains positive at the terminal P 1 434 relative to the output of terminal P 2 436, further current pulses are produced by repeating the process described hereinbefore, beginning at "CASE 1: PWM modulation for positive half wave of the grid".

The negative zero crossing of the grid voltage is defined as the condition wherein the voltage at terminal P 1 434 is equal to the voltage at terminal P 2 436 after P 1 434 has been more positive than P 2 436. Prior to the negative zero crossing, Q 1 404 is turned on, thereby removing current from CR 11 424 and CR 21 426. At this point the signals CR 11 T 419 and CR 21 T 421 are de-asserted, preventing SCRs CR 11 424 and CR 21 426 from conducting current during the grid negative half cycle. After the negative zero crossing, with the voltage of terminal P 1 434 more negative than the voltage of terminal P 2 436, the signals CR 22 T 420 and CR 12 T 421 are then asserted, enabling CR 22 423 and CR 12 425 to conduct when current is applied to them.

CASE 2: PWM Modulation for Negative Half Wave of Grid

Figure 6:
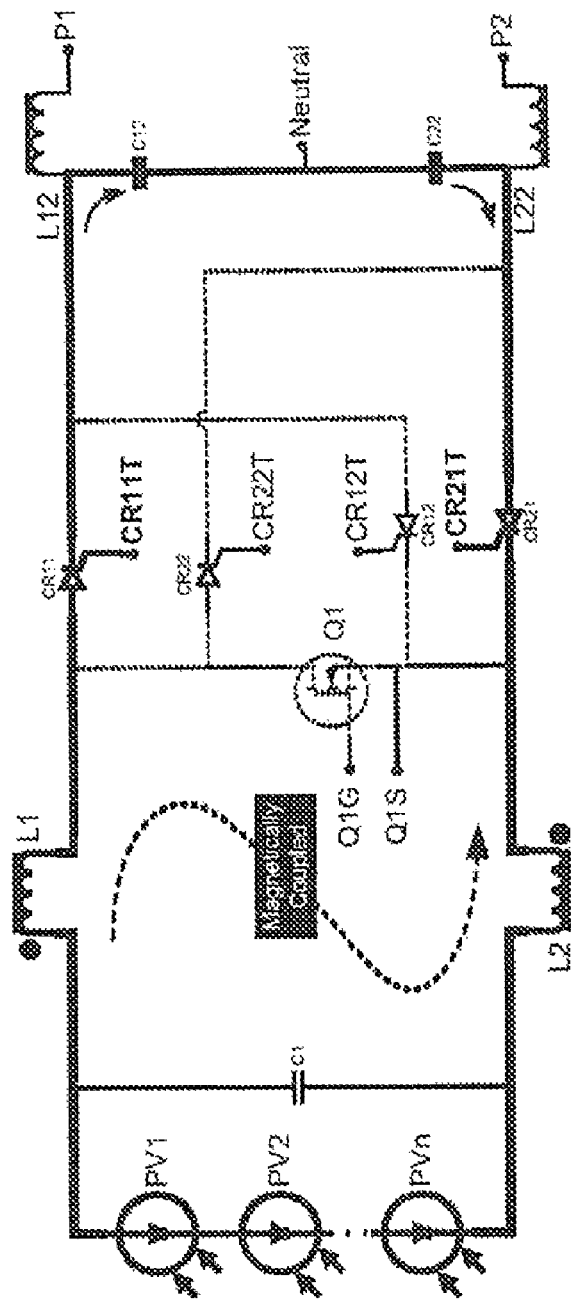
FIG. 6 shows a pulse amplitude modulated current converter with current flowing through into the reconstruction filters for the grid positive half phase.
Figure 7:
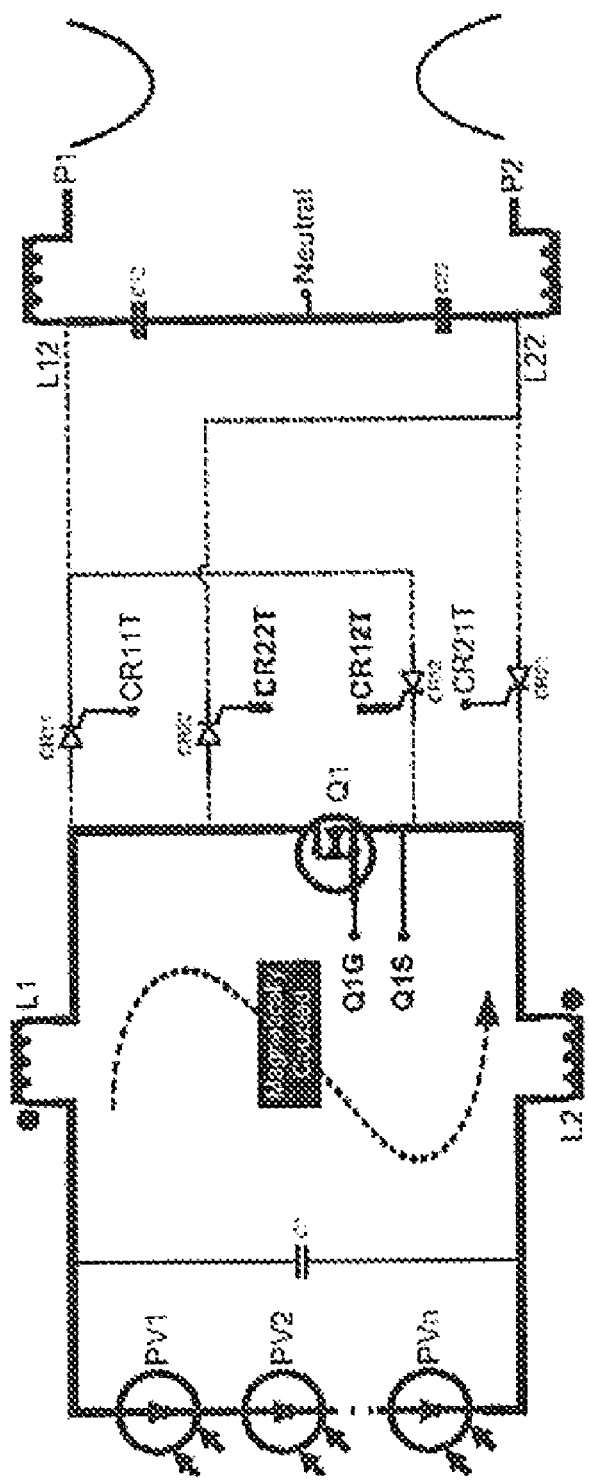
FIG. 7 shows a pulse amplitude modulated current converter with a transistor completing the circuit to charge inductors while reconstruction filters produce current pulses for the grid negative half phase.
Figure 8:
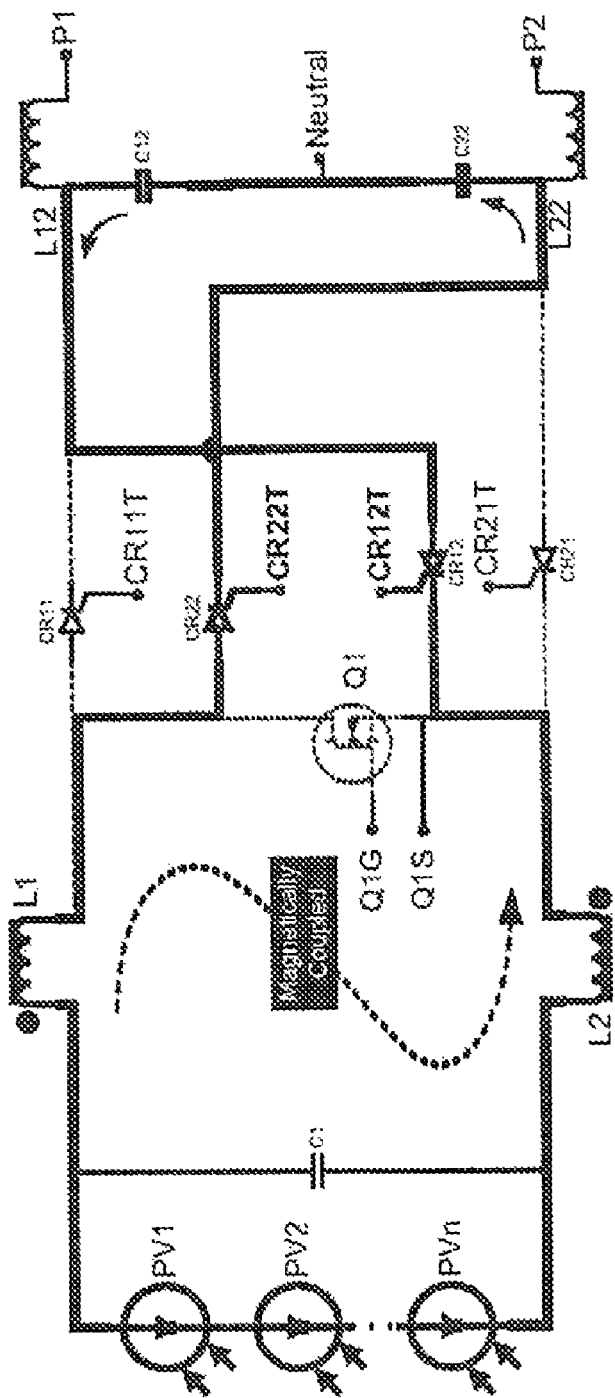
FIG. 8 shows a pulse amplitude modulated current converter with current flowing through into the reconstruction filters for the grid negative half phase.

Referring to FIG. 6, with L 1 406 and L 2 405 charged Q 1, 404 is turned off for a pulse width modulated time. After the off time has expired, Q 1 404 is turned on until the end of the instant current switching cycle. During the time that Q 1 404 is off, current previously stored in L 1 406 and L 2 405 together with the current flowing in PV 401 is applied to the input terminals of CR 12 425 and CR 22 423 which remain enabled by signals CR 22 T 420 and CR 12 T 421 for the entire negative half cycle of the grid. The negative half cycle of the grid is defined as the condition wherein the voltage at terminal P 1 434 is less than the voltage at terminal P 2 436. The charge in the current pulse delivered through the SCR CR 22 423 is initially stored on capacitor C 22 440, creating a voltage more positive on the near end of coil L 22 431 relative to the end connected to terminal P 2 436. The charge in the current pulse delivered through CR 12 425 is initially stored on C 12, a voltage more positive on the near end of coil L 12 430 relative to the end connected to terminal P 1 434. This is the initial condition for both reconstruction filter comprising L 12 430, C 12 438 and reconstruction filter comprising L 22 431, C 22 440. At this point the reconstruction filters will transform the pulse width modulated current pulse delivered to them to a pulse amplitude modulated half sine wave of current delivered to the grid as shown in FIG. 6.

The reconstruction filters for Case 2 are the same components as described in association with Case 1; their design and operation are not repeated here.

The off time of Q 1 404 is modulated such that the width of current pulses produced is in the shape of the grid sine wave. The reconstruction filters transform this sequence of pulse width modulated current pulses into a sequence of pulse amplitude modulated current pulses whose amplitude follow corresponding points of the shape of the grid sine wave.

So long as the grid half cycle remains negative, with the voltage of terminal P 1 434 more negative than the voltage of terminal P 2 436, further current pulses are produced by repeating the process described hereinbefore, beginning at "CASE 2: PWM modulation for negative half wave of grid."

The positive zero crossing of the grid voltage is defined as the condition wherein the voltage at terminal P 1 434 is equal to P 2 436 after the voltage at terminal P 1 434 has been more negative than the voltage of terminal P 2 436. Prior to the positive zero crossing, Q 1 404 is turned on, removing current from SCRs CR 12 425 and CR 22 423. At this point the signals CR 12 T 421 and CR 22 T 420 are de-asserted, preventing SCRs CR 12 425 and CR 22 423 from conducting current during the grid positive half cycle. After the positive zero crossing with P 1 434 more positive than P 2 436, signals CR 11 T 419 and CR 21 T 421 are asserted, enabling SCRs CR 11 424 and CR 21 426 to conduct when current is applied to them.

The positive zero crossing of the grid voltage is defined as the condition wherein the voltage at terminal P 1 434 is equal to P 2 436 after the voltage at terminal P 1 434 has been more negative than the voltage of terminal P 2 436. Prior to the positive zero crossing, Q 1 404 is turned on, removing current from SCRs CR 12 425 and CR 22 423. At this point the signals CR 12 T 421 and CR 22 T 420 are de-asserted, preventing SCRs CR 12 425 and CR 22 423 from conducting current during the grid positive half cycle. After the positive zero crossing with P 1 434 more positive than P 2 436, signals CR 11 T 419 and CR 21 T 421 are asserted, enabling SCRs CR 11 424 and CR 21 426 to conduct when current is applied to them.

With the grid again positive, the process would again return to the process described hereinbefore, beginning with the section labeled CASE 1: PWM modulation for positive half wave of the grid.

Figure 9:
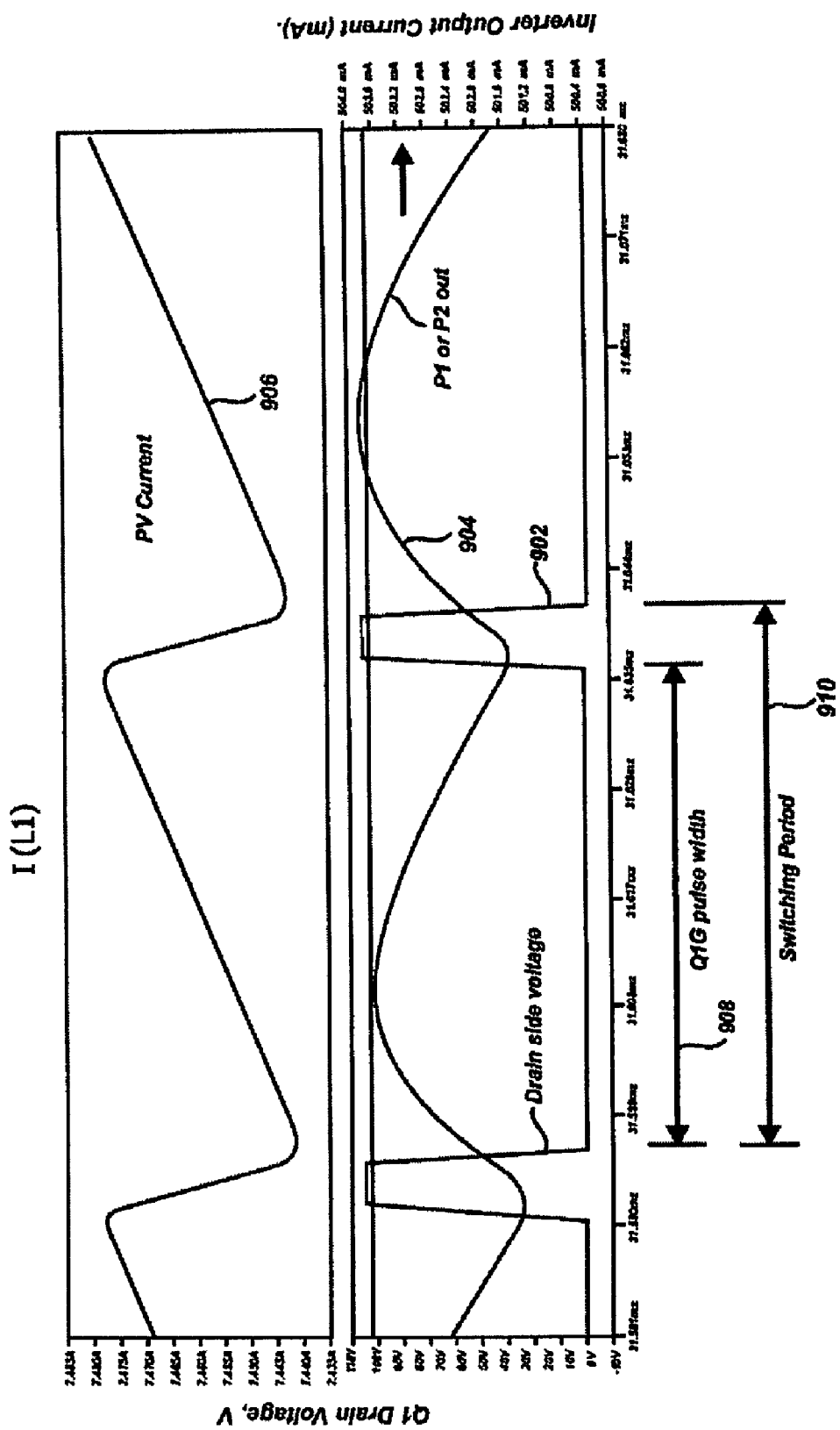
FIG. 9 relates the timing of drive signals and current.

FIG. 9 shows a signal diagram of the results of the conversion of a pulse width modulated pulse, translated into a pulse amplitude modulated (PAM) current pulse by a reconstruction filter, such as those previously disclosed hereinbefore (L 12 430 and C 12 438; L 22 431 and C 22 440). The short duration roughly rectangular voltage pulses 902 are the voltage on the drain side 451 (FIG. 4) of Q 1 404. The pulse width labeled 908 approximates the pulse width of the signal Q 1 G on line 411 (FIG. 4) and the period 910 is the switching period of the PAMCC 400. This voltage drives the transformer 407 and PV 401 currents through a SCR CR 11 424 or CR 12 425 (depending upon the instant status of the control signals from controller 412, as previously described) into the input of one of the reconstruction filters. The rounded half wave rectified sine wave 904 is the output of the reconstruction filter. As the pulse width 908 (approximately) of the input pulse increases, the amplitude of the output wave form 904 increases. The triangular wave form 906 at the top of the graphs plots the variation of current through PV 401 during the common window of time. Trace 906 shows the effect of transformer 407 in maintaining a relatively constant PV 401 current, independent of the relatively large pulse width modulated current pulses provided to the reconstruction filters.

Figure 10:
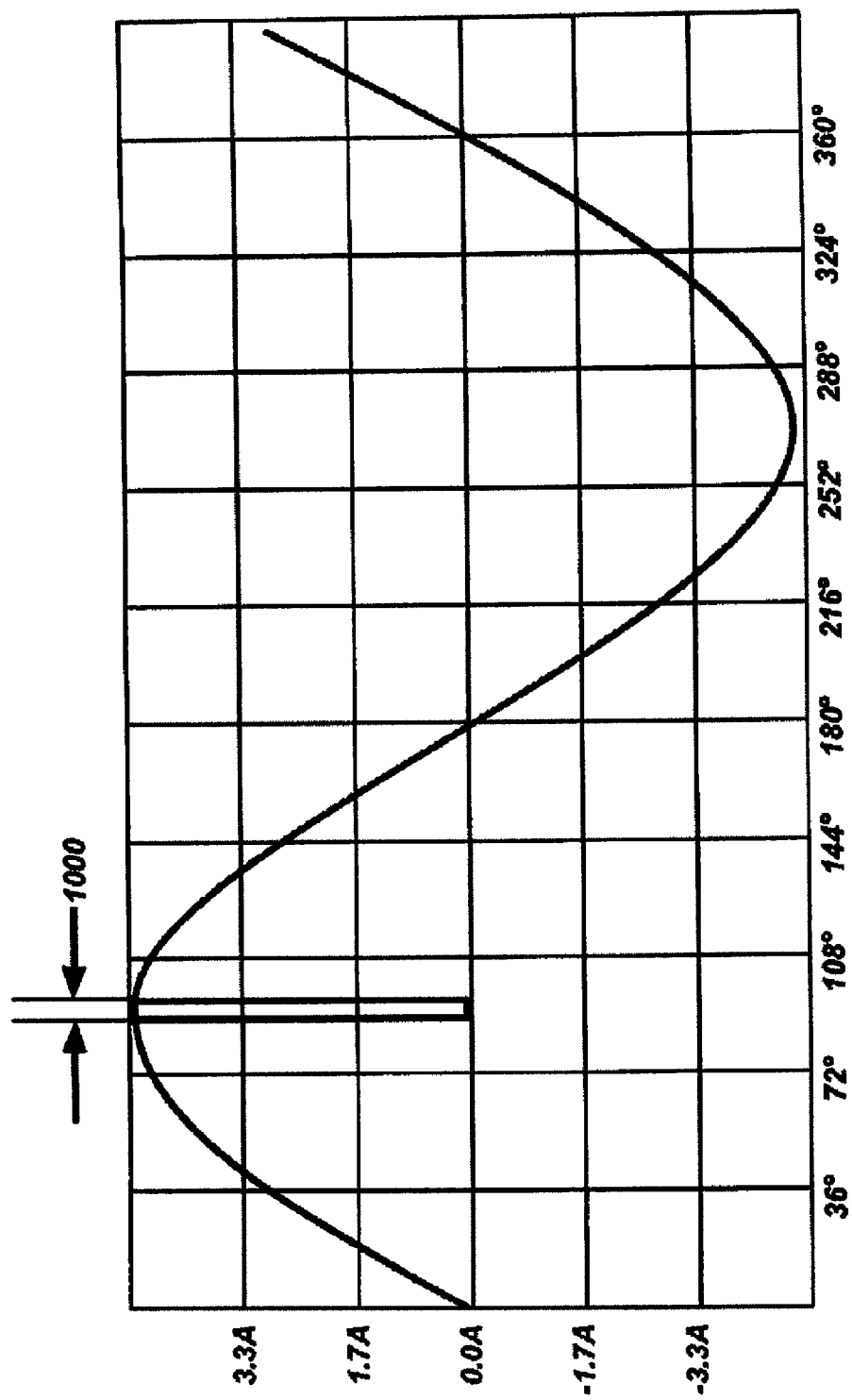
FIG. 10 shows what portion of current in a sine wave of current will be examined in detail in some following drawings.
Figure 11:
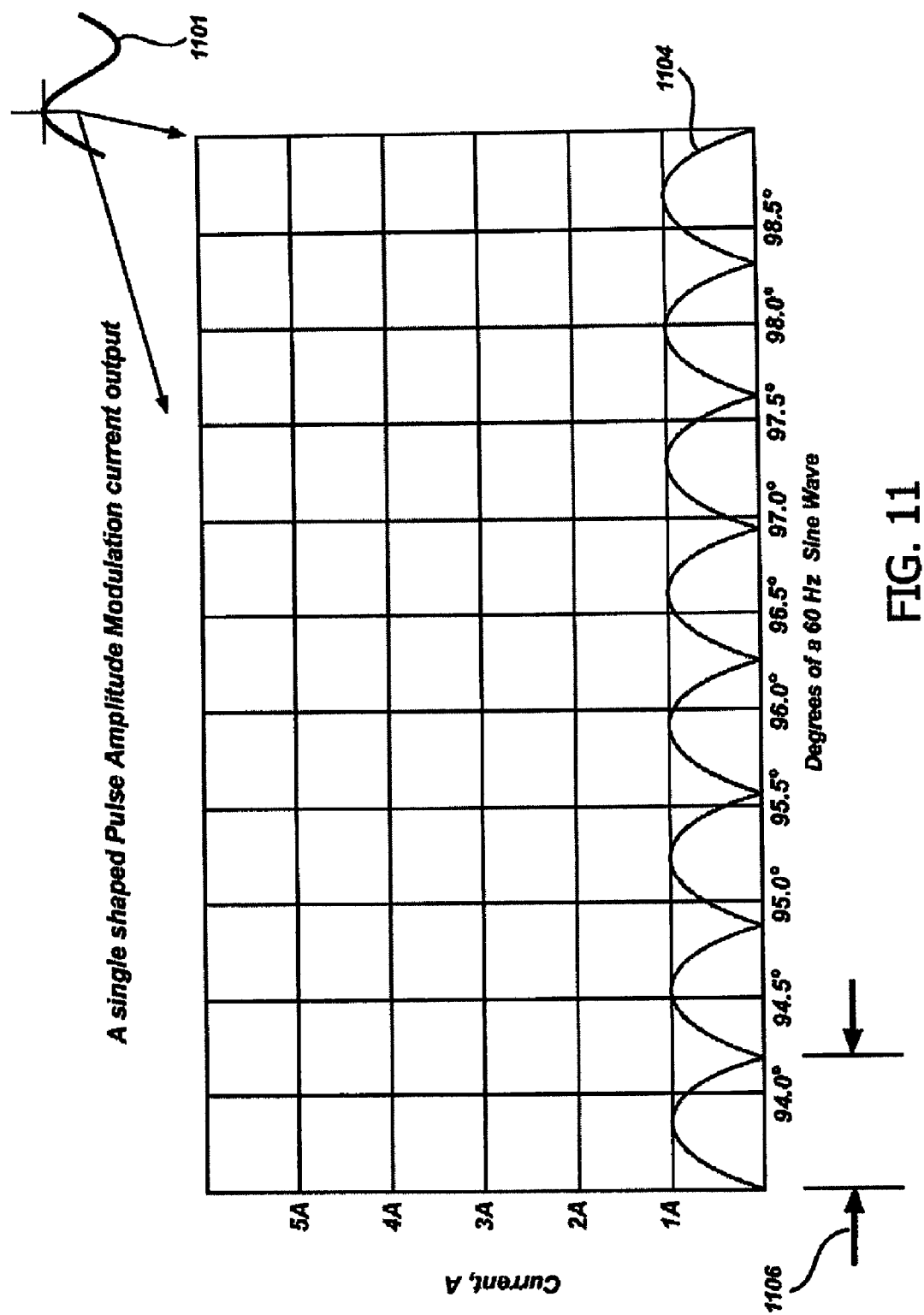
FIG. 11 shows the pulses provided by a single pulse amplitude modulated current converter.
Figure 12:
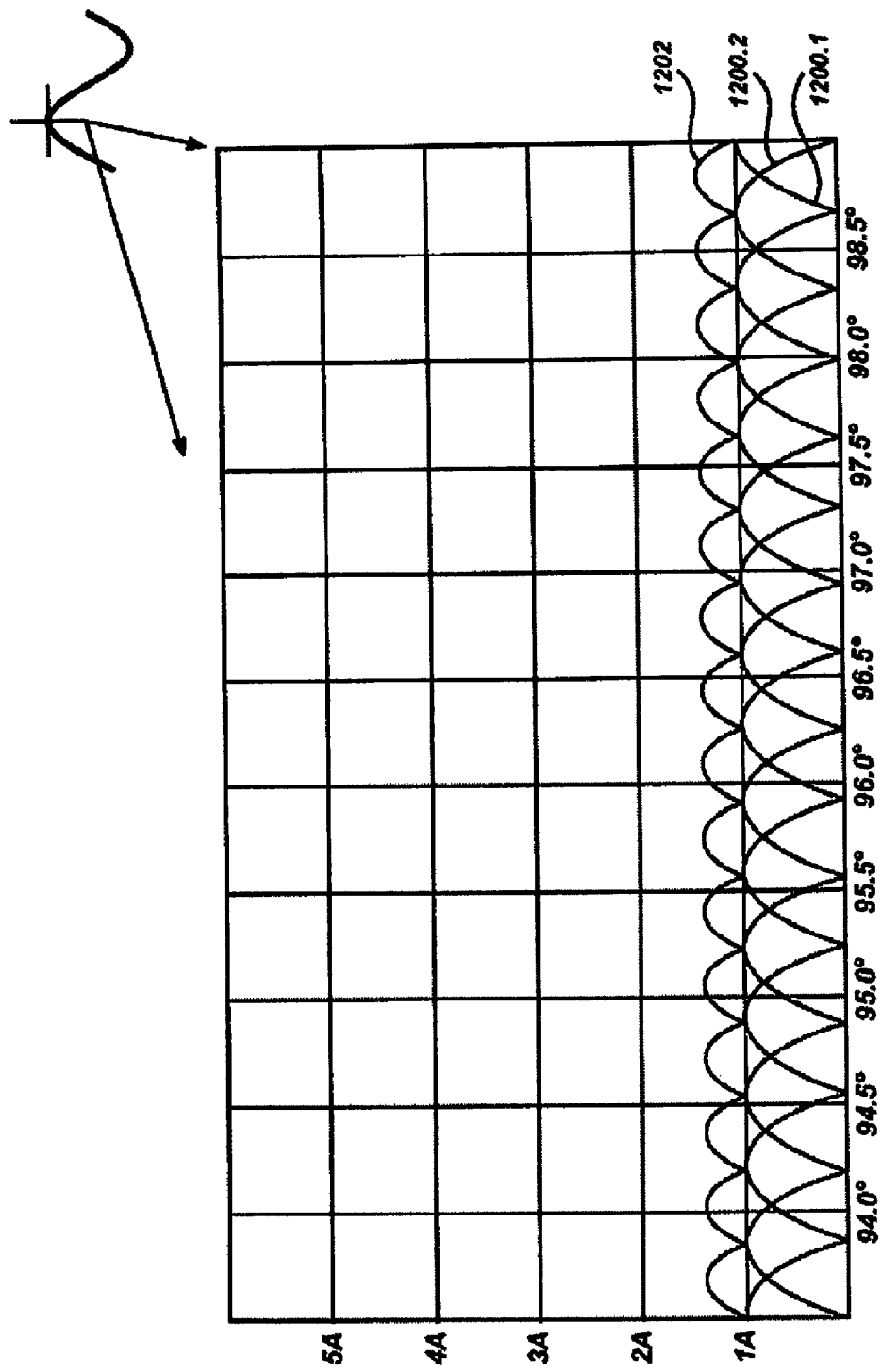
FIG. 12 shows the pulses provided by two pulse amplitude modulated current converters and their total, summed current.
Figure 13:
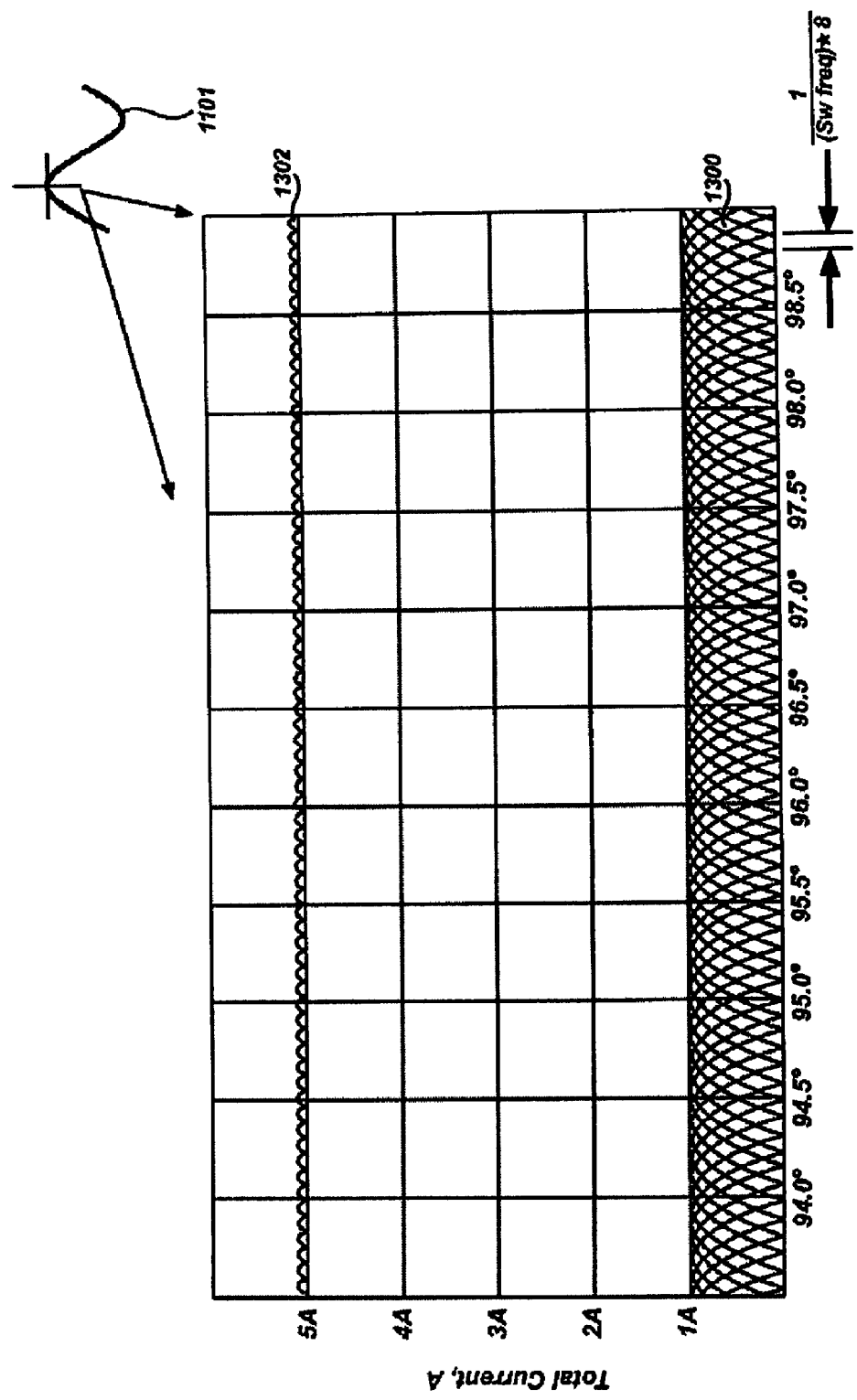
FIG. 13 shows the pulses provided by eight pulse amplitude modulated current converters and their total, summed current.

FIG. 10 indicates the narrow time slice of a grid sine wave cycle to be depicted in FIGS. 11, 12 and 13.

FIG. 11 shows the pulse amplitude modulated output current of a single PAMCC 400. Note that the amplitude shown is for a small portion of time near the positive peak of the grid voltage as indicated on the cycle example 1101. The individual pulses 1104 have a period 1106 equal to the period of the switching frequency, for example (⅟30 KHz).

In FIG. 12, two individual currents (1200.1 and 1200.2) of two PAMCCs (each in accordance with the PAMCC 400) are phased apart one half of the period of the switching frequency. The trace 1202 above is the sum of the two PAMCC output currents 1200.1 and 1200.2. Note that the summed current 1202 has a much smaller ripple than the ripple of a single PAMCC (see FIG. 11) and has twice the ripple frequency as of the ripple frequency of a single inverter. The summed current 1202 does not return to zero.

Following on the summation of the currents of two PAMCC 400 outputs, FIG. 13 shows the individual output currents of eight PAMCCs (the line 1300 is representative; each waveform is not numbered), each phased evenly across the period of the switching frequency. For example for a system using a 30 KHz switching frequency, the period is 33.3 microseconds and each phase is delayed by (33.3/8), or 4.167 microseconds, relative to the previous output current waveform. Any number of PAMCCs 400 may be so summed. As the number summed increases they are each phase delayed by a smaller number (1/(switching frequency)*n) where "n" is the number of PAMCCs summed. Note that the summed current shown in FIG. 13 has only a fraction of the ripple current of an individual PAMCC (FIG. 12) and has eight times the ripple frequency of that of an individual PAMCC. If each PAMCC 400 is producing a point on a grid sine wave with its sequence of PAM current pulses, phasing and summing a set of PAMCCs, forming an array of converters, will effectively demodulate a grid sine wave of current with very high accuracy and very low noise (ripple). Any number of array converters may be phased and summed in this way. As the number of PAMCCs is increased, the ripple amplitude decreases and the ripple frequency increases. In one embodiment two or more of the plurality of PAMCC 400 individual output currents are in phase with each other. In some embodiments the switching frequency is selected so as to be unrelated to the grid frequency, for example 60 Hz in the United States, the ripple will not represent harmonic distortion. Signals modulated onto the PAMCC output are arbitrary. In some embodiments multiple signals are modulated onto the PAMCC output, wherein one of such signals may, for example, provide for communication between an arbitrary two or more PAMCC modules. The PAMCC modulation is sometimes used to correct for distortion in the grid signal.

One of several ways to choose the phasing of the arrayed PAMCCs 400 is for each PAMCC 400 to be pre-assigned a timing slot number, with the first slot being scheduled following a zero crossing and each PAMCC 400 firing its PAM signal in the predetermined (i.e., assigned) sequence.

Figure 14:
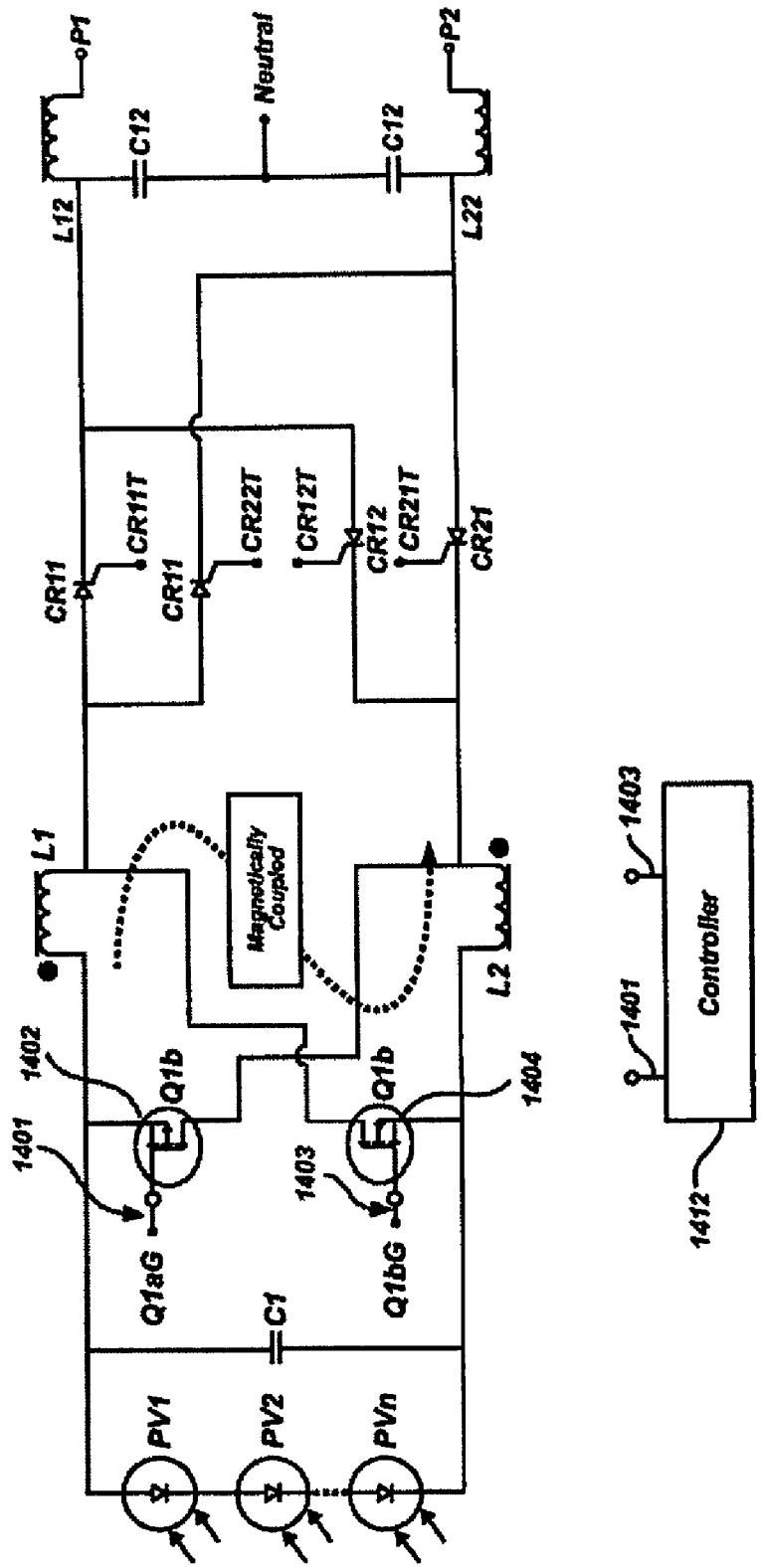
FIG. 14 shows an alternative circuit for a single pulse amplitude modulated current converter.

In an alternative embodiment, exemplified in FIG. 14, a second transistor is added, wherein Q 1 A 1402 and Q 1 B 1404 replace the single transistor Q 1 404 as was shown and described in the circuit of FIG. 4. Using the two transistors Q 1 A 1402 and Q 1 B 1404 provides some potential advantages, including reducing the voltage across each transistor, allowing a more relaxed Rds_on (the "on" resistance) requirement for each transistor compared to the Rds_on requirement of Q 1 404, and allowing each transistor to be driven with respect to the relatively low voltage and stable anode and cathode ends of PV 401. In this configuration, Q 1 A 1402 and Q 1 B 1404 are both turned on and off at the same times as with Q 1 404 in the previous discussion. All other aspects of the circuit operation remain the same. Q 1 A 1402 and Q 1 B 1404 are of different transistor types, so separate signals to their control gates are provided by the control 1412. Controller 1412 is otherwise the same as controller 412 of FIG. 12, with the addition of output terminals connected to the control gates of Q 1 A 1402 and Q 1 B 1404 via lines 1401 and 1403 respectively.

Figure 15:
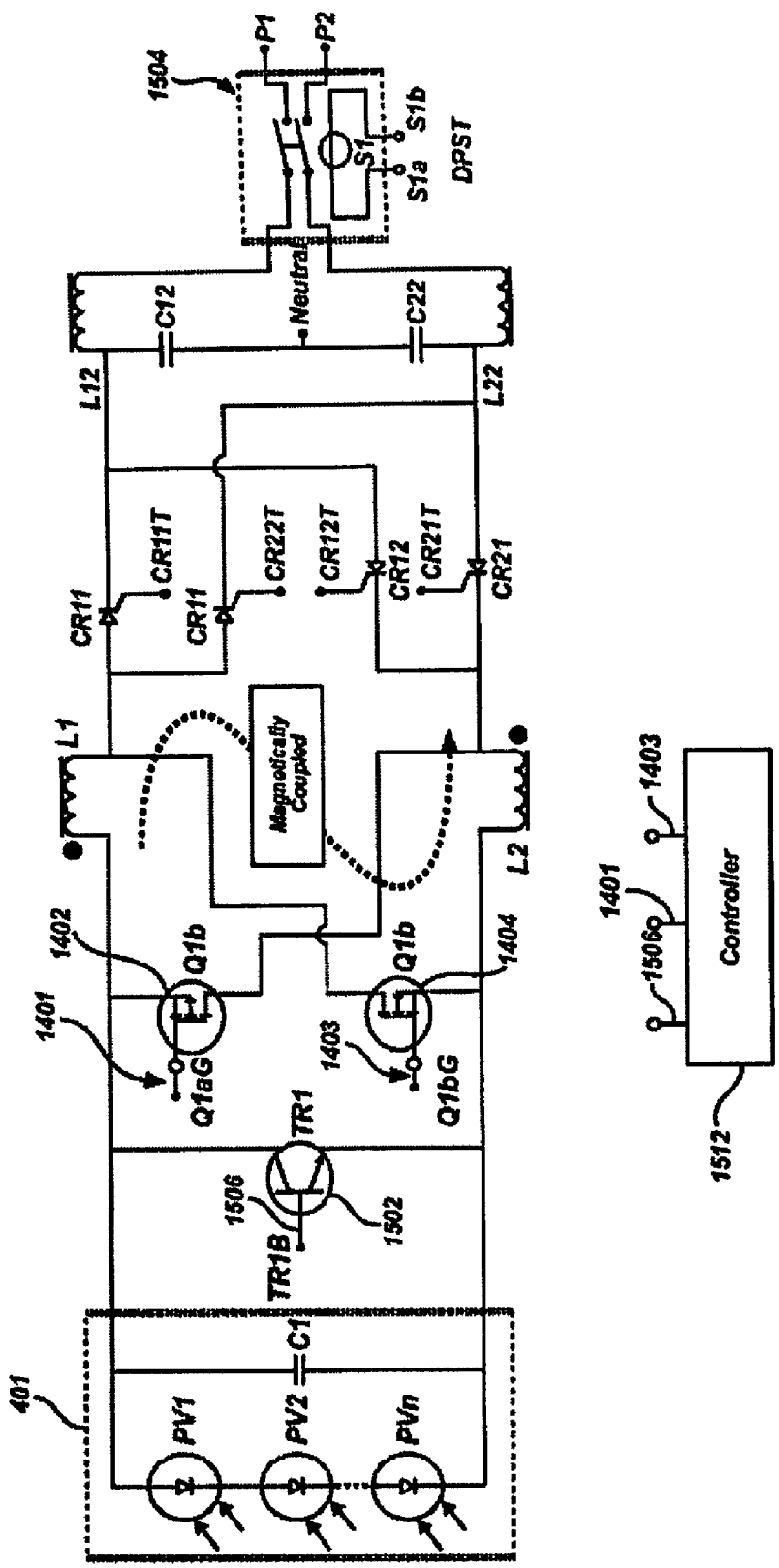
FIG. 15 shows a circuit for a single pulse amplitude modulated current converter wherein the converter can be disabled.

In some embodiments the system may be shut down for safety, maintenance, or other purposes. One example of a shut-down method is shown in FIG. 15. A transistor TR 1 1502 and a relay S 1 1504 are added as shown. Note that this example includes the two transistors Q 1 A 1402 and Q 1 B 1404, however the same shut-down provision can be added to the circuit of FIG. 4, wherein the two transistors Q 1 A and Q 1 B are replaced by the single transistor Q 1 404. Transistor TR 1 1502 and relay S 1 1504 provide for the safe shutdown of PAMCC while connected to PV 401, which is illuminated and producing power. The shutdown process is initiated by providing a signal TR 1 B from controller 1512 on a line 1506, the line 1506 connected to the control gate of the transistor 1502. When transistor TR 1 1502 turns on, TR 1 creates a short path for current produced by PV 401, which results in the voltage across PV 401 to be reduced to a small level. At this point, Q 1 A 1402 and Q 1 C 1404 are energized to allow the currents in the coils L 1 406 and L 2 405 to fall to a low level. After the coils L 1 and L 2 are discharged, relay S 1 1504 is opened. With the path to the grid now open, Q 1 A 1402 and Q 1 B 1404 are turned off, followed by turning off transistor TR 1 1502. In this configuration, no further power will be produced.

A power generating system, such as a solar power generation system, includes an electronic controller to control the power output of the system. Rather than a method for voltage regulation, the present invention is a power regulation method wherein a value of output voltage of the system is frequently measured, the voltage value then divided into a target value for power to determine a value of current to be provided to the load, the system then controlled to provide the calculated current value, thereby regulating the power as desired. In some embodiments the sample and response frequencies are much higher than the frequency of noise that may be present at the output terminals of the power generation system (whether caused by the system or the load), thereby negating the noise to provide a noise-reduced electrical output.

In the prior art, noise is suppressed by filtering techniques, whether proactively provided for or as an inherent characteristic of the system. Note though that in such systems the instant value of current is a modification of the previous value. These systems are characterized as "continuous" systems. In a system wherein current may be provided as an arbitrary value, that is a "discontinuous" system, power is controlled at any instant by providing a value of current that is not a function of a previous value. An example of a discontinuous control system is an array converter as disclosed in the '025 application and above.

Potential electrical disturbances include induced power spikes, the sudden connection or removal of a load connected to a system, lightning strikes, and component failures. It is important to note that the method of the present invention is not simply a filtering mechanism, but is a control function wherein a power source connected to a load proactively controls the current to provide an ideal power output. The load connected to the power generation system may be powered devices such as appliances, an electrical grid, or both. Switching power converters convert power at one voltage and current to the same power (less losses) at a different voltage and current. Since the method of the present invention regulates power output, the input power is also regulated. The action of the method will tend to oppose any distortion in the applied grid voltage by generating an opposite and proportional distortion in current injected into the load.

Figure 16:
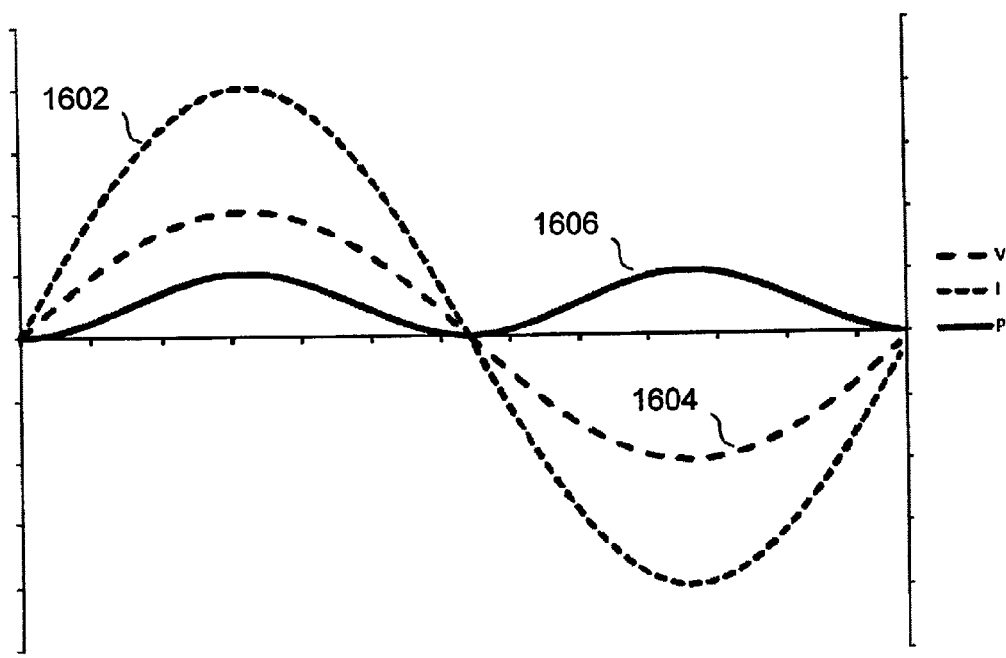
FIG. 16 is graph of the voltage, current, and power level of an undistorted, ideal alternating current power output.

Looking to FIG. 16, an ideal, i.e. "clean" power signal from a grid 1606 is shown. As is well known, the power 1606 is equal to the product of the current 1602 times the voltage 1604 at any instant in time. Thus if one knows any two of these three parameters 1602, 1604, 1606 the third may be exactly determined.

According to the present invention, an idealized model of power 1506 as a function of time is predetermined for a given time period, for example one or more cycles of an AC power grid. Although FIG. 16 and FIG. 17 illustrate an alternating current power output, the methods of the present invention are also applicable to a DC system.

Figure 17:
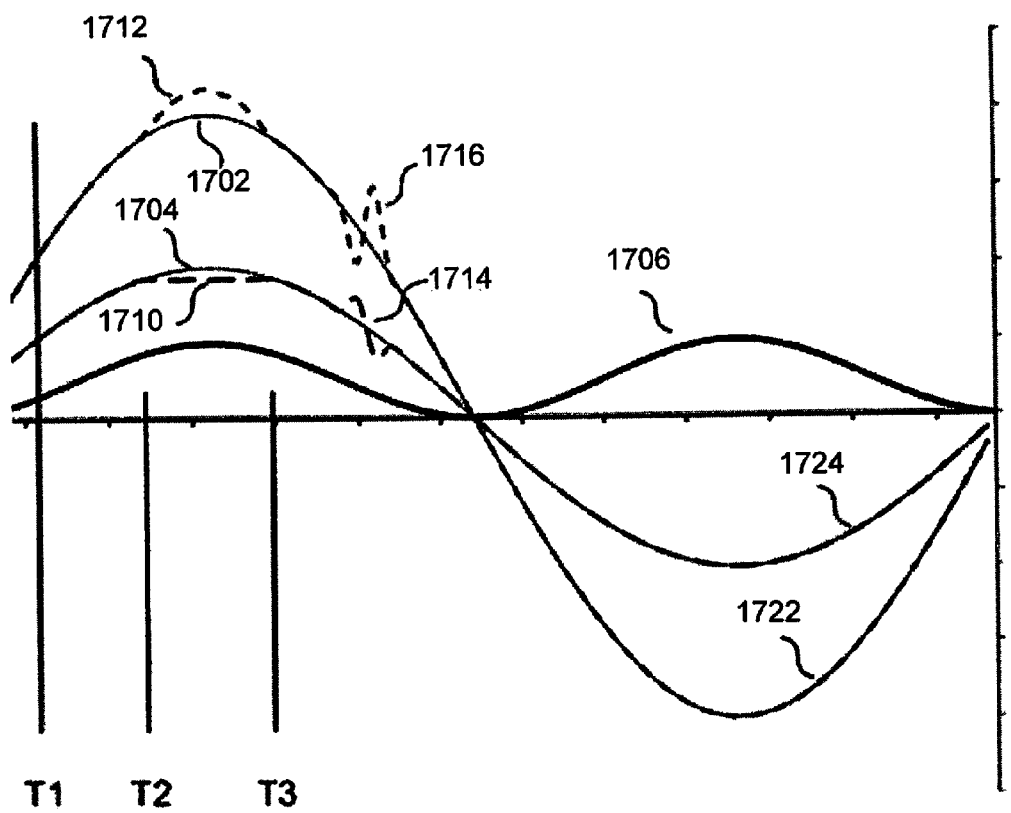
FIG. 17 is a graph of the voltage, current, and power level of a distorted voltage output, wherein corrective current is provided, as one example of the present invention.

In FIG. 17 thin lines representing idealized voltage 1704 and current 1702 are shown for reference. Looking to FIG. 17, the voltage signal 1724 is sampled frequently, for example at time T1. The sensed value of voltage is converted to a numerical representation, for example by an analog to digital converter controlled by a system controller. After digital conversion, the controller refers to a model of desired power 1706 for the instant time and determines the value of current 1722 to be provided by the system, thereby controlling the power 1706 to the desired profile.

Still looking to FIG. 17, consider sampling the voltage during a time window from T2 to T3, wherein an example of a voltage perturbation 1710 is shown. Using the same method as described hereinabove, current values are calculated during the T2-to-T3 time period and provided as shown as a response current 1712, thereby again controlling the power 1706 to the desired profile. Response is improved by using a sample frequency higher than the frequency of noise which is anticipated and tolerated by the system designer.

Another example of a voltage distortion and automatic corrective response is also shown in FIG. 17. A perturbation 1714 relative to the ideal voltage 1704 has both a positive and a negative excursion. By the method described herein above, corrective action is taken by injecting first less, then more current 1712 relative to the idealized current 1702, as shown, again providing the desired power output.

The frequency of the power signal is arbitrary, including zero hertz (that is, direct current). Likewise the frequency of sampling the voltage value and providing responsive current is arbitrary. Higher sampling and response frequencies enable negating higher frequency noise than do lower frequencies. In one embodiment a sampling frequency of 30 Khz is used.

Figure 18:
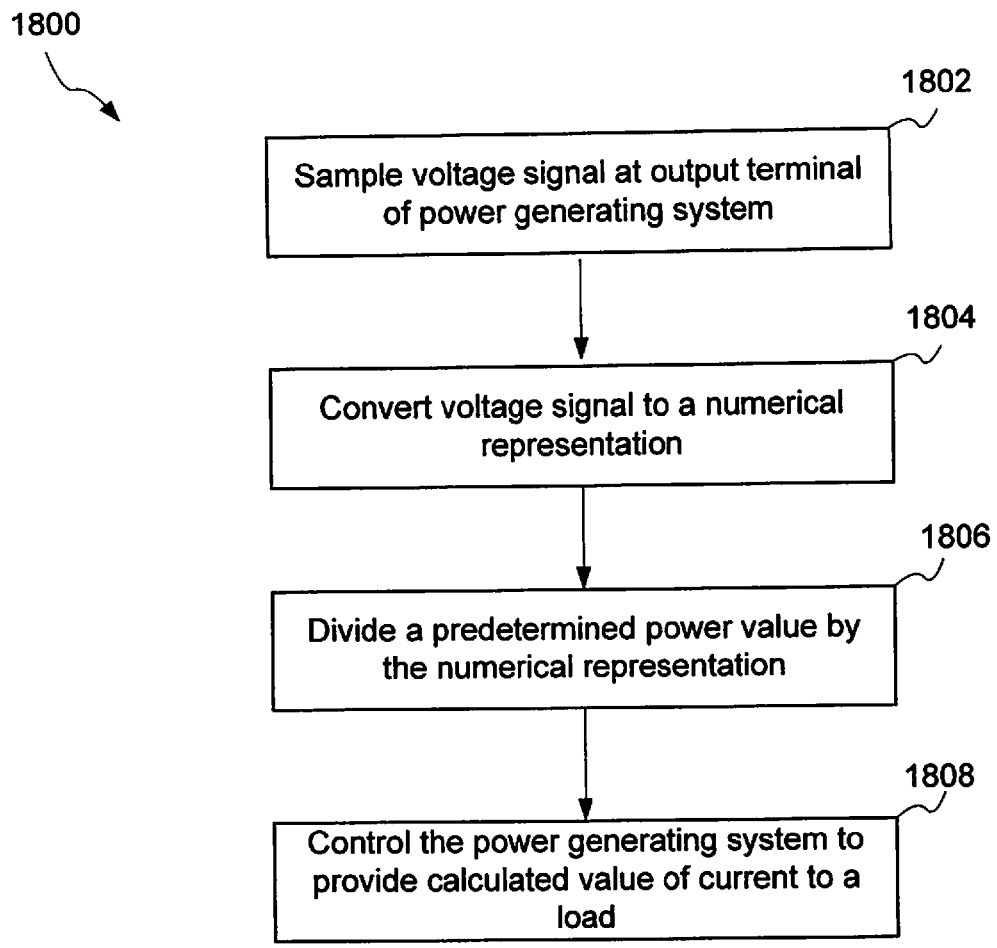
FIG. 18 is a process flow diagram of a method for controlling power output, according to an embodiment.

FIG. 18 illustrates an embodiment method 1800 for the controlling power output of a power generating system. At block 1802 of method 1800, a voltage signal at an output terminal of the power generating system may be sampled. At block 1804, the voltage signal from block 1802 may be converted to a numerical representation. At block 1806, a value of current may be calculated by dividing a predetermined power value by the numerical representation of the voltage signal obtained in block 1804. At block 1808, the power generating system may be controlled to provide the value of current to load calculated in block 1806.

What is claimed is:

1. An electronic controller of a power generation system, comprising:
   a processor, and;
   a plurality of pulse amplitude modulated current converters ("converters") coupled to the processor, each converter configured to be connected to one of a plurality of direct electrical current sources, wherein each of the converters is configured to receive direct electrical current from its one of a plurality of direct electrical current sources and each of the converters provides pulse amplitude modulated current pulses at an output terminal of the converter and further wherein the output terminal of each converter is electrically connected in parallel with the output terminals of all of the other converters in the power generation system,
   wherein the processor is configured with processor-executable instructions to perform operations comprising:
      controlling the operation of each converter such that the current pulses of at least two converters are out of phase with respect to each other, thereby summing the current pulses of all of the converters such that a signal modulated onto the pulse output of the converters is demodulated.

2. The electronic controller of claim 1, further comprising:

a voltage signal sensing circuit; and a voltage converter coupled to the voltage sensing circuit and to the processor, wherein the processor is configured with processor-executable instructions to perform operations further comprising:

sampling a voltage signal at an output terminal of the power generation system;

receiving from the voltage converter a numerical representation of the voltage signal;

dividing a predetermined power value by the numerical representation of the voltage signal, thereby calculating a value of current; and controlling the power generation system to provide the calculated value of current to a load.

3. The electronic controller of claim 2, wherein sampling the voltage signal is repeated at a frequency.

4. The electronic controller of claim 3, wherein the sampling frequency is thirty-kilohertz.

* * * * *